US012797287B2

(12) United States Patent
Wu

(10) Patent No.: US 12,797,287 B2
(45) Date of Patent: Nov. 17, 2026

(54) MASSAGE DEVICE

(71) Applicant: Dongguan Dibe Electronic Technology Co. Ltd, Dongguan (CN)

(72) Inventor: Sikun Wu, Dongguan (CN)

(73) Assignee: DONGGUAN DIBE ELECTRONIC TECHNOLOGY CO. LTD, Dongguan (CN)

( * ) Notice: Subject to any disclaimer, the term of this patent is extended or adjusted under 35 U.S.C. 154(b) by 295 days.

(21) Appl. No.: 18/808,114

(22) Filed: Aug. 19, 2024

(65) Prior Publication Data

US 2025/0352428 A1 Nov. 20, 2025

(30) Foreign Application Priority Data

May 14, 2024 (CN) ......................... 202421046090.3
Jul. 15, 2024 (CN) ......................... 202421669632.2

(51) Int. Cl.

*A61H 19/00* (2006.01)
*A61H 23/00* (2006.01)
*A61H 23/02* (2006.01)
*A61H 21/00* (2006.01)

(52) U.S. Cl.

CPC ........... *A61H 23/006* (2013.01); *A61H 19/00* (2013.01); *A61H 19/30* (2013.01); *A61H 23/0254* (2013.01); *A61H 19/50* (2013.01); *A61H 21/00* (2013.01); *A61H 2201/0192* (2013.01); *A61H 2201/1215* (2013.01); *A61H 2201/1454* (2013.01); *A61H 2201/1676* (2013.01); *A61H 2201/1678* (2013.01)

(58) Field of Classification Search

CPC ........ A61H 19/00; A61H 19/30; A61H 19/34; A61H 19/40; A61H 19/44; A61H 19/50; A61H 23/00; A61H 23/02; A61H 23/006; A61H 23/0254; A61H 2201/0192; A61H 2201/1215; A61H 2201/1454; A61H 2201/1676; A61H 2201/1669; A61H 21/00; A61H 2201/1678

See application file for complete search history.

(56) References Cited

U.S. PATENT DOCUMENTS 11,369,545 B1 * 6/2022 He ......................... A61H 7/005
11,554,073 B1 * 1/2023 Guo ....................... A61H 7/007

(Continued)

*Primary Examiner* — Bradley H Philips
*Assistant Examiner* — Tyler A Raubenstraw
(74) *Attorney, Agent, or Firm* — Frank Niranjan

(57) ABSTRACT

A massage device includes a shell. Receiving spaces are formed in opposite sides of the shell, and an accommodating chamber is formed in the shell and located on one side of the receiving spaces. A driving device is arranged in the accommodating chamber. At least one massage component is connected to and driven by the driving device. The massage component includes two swing arms and wrappers wrapping free ends of the swing arms respectively located in the receiving spaces. When the driving device drives the massage component to swing, the two swing arms on the same massage component swing in a same direction or in opposite directions between inside the receiving spaces and outside the shell. The massage device can realize synchronous percussive massage of multiple body parts in different directions of users without adjusting the direction in which the massage device is held.

20 Claims, 16 Drawing Sheets

(56) References Cited

U.S. PATENT DOCUMENTS

| | | | | |
|---|---|---|---|---|
| 11,633,327 | B1 * | 4/2023 | Wu | A61H 23/0263<br>601/70 |
| 11,833,100 | B1 * | 12/2023 | Liu | A61H 9/0057 |
| 11,850,204 | B2 * | 12/2023 | Williams | A61H 23/0254 |
| 12,011,409 | B1 * | 6/2024 | Wang | A61H 19/40 |
| 12,036,176 | B1 * | 7/2024 | Wang | A61H 23/0263 |
| 12,064,386 | B1 * | 8/2024 | Yan | A61H 23/02 |
| 12,178,773 | B1 * | 12/2024 | Wang | A61H 19/44 |
| 12,186,257 | B1 * | 1/2025 | Cun | A61H 23/006 |
| 12,447,098 | B1 * | 10/2025 | He | A61H 19/44 |
| 2008/0139980 | A1 * | 6/2008 | Fladl | A61H 19/32<br>601/70 |
| 2011/0218395 | A1 * | 9/2011 | Stout | A61F 5/00<br>600/38 |
| 2011/0257473 | A1 * | 10/2011 | Torla | A61H 19/50<br>600/38 |
| 2015/0148592 | A1 * | 5/2015 | Kanbar | A61H 19/34<br>600/38 |
| 2015/0182413 | A1 * | 7/2015 | Guang | A61H 23/0263<br>601/46 |
| 2015/0320636 | A1 * | 11/2015 | Fine | A61H 19/44<br>600/38 |
| 2017/0105896 | A1 * | 4/2017 | Derwin | A61H 19/34 |
| 2017/0189264 | A1 * | 7/2017 | Ross | A61H 23/02 |
| 2017/0266076 | A1 * | 9/2017 | Chen | A61H 19/34 |
| 2019/0209426 | A1 * | 7/2019 | Swartz | A61H 19/40 |
| 2022/0168179 | A1 * | 6/2022 | Peck | A61H 7/003 |
| 2022/0257459 | A1 * | 8/2022 | Dickinson | A61H 23/0263 |
| 2024/0050307 | A1 * | 2/2024 | Luo | A61H 19/44 |
| 2024/0299237 | A1 * | 9/2024 | Yan | A61H 23/0263 |

* cited by examiner

MASSAGE DEVICE

FIELD

The application belongs to the technical field of massage device s, and more particularly, relates to a massage device.

BACKGROUND

With the continuous increase of customer's demand for massage devices, traditional massage devices cannot satisfy the requirements of customers anymore. In the related art, the massage devices are provided with only one percussion component, which can percuss and massage a body part in only one direction when driven by a driving device to swing, so existing massage devices cannot satisfy the requirements of customers for percussive massage in multiple directions because of their limitations in the percussive massage direction; and in addition, when percussing a small body part, the customers often need to adjust the holding direction of the massage devices, leading to inconvenience in use of the massage devices.

SUMMARY

There is a need to provide an improved massage device which can overcome some of the above problems.

The present application provides a massage device which comprises a shell. Receiving spaces which are mutually isolated or partially connected are formed in at least two opposite side faces of the shell. Each of the receiving spaces has a depth and is connected to a corresponding one of the side faces of the shell. An accommodating chamber is formed in the shell and the accommodating chamber is located on a side of the receiving spaces. A driving device is arranged in the accommodating chamber. At least one massage component is connected to the driving device and driven by the driving device to swing. Each of the at least one massage component comprises two swing arms and wrappers wrapping free ends of the swing arms, and the free ends of the swing arms are respectively located in the receiving spaces oppositely arranged on the shell; and when the driving device drives the at least one massage component to swing, the two swing arms on a same massage component swing in a same direction or in opposite directions between inside the receiving spaces and outside the shell.

In some embodiments, each of the wrappers has a thickness less than the depth of a corresponding one of the receiving spaces in the shell.

In some embodiments, the shell is made from an elastic material.

In some embodiments, the wrappers and the shell are formed integrally from the same elastic material.

In some embodiments, each of the wrappers comprises at least one strip-shaped structure.

In some embodiments, the wrappers are connected to the shell by means of a connecting member, and in the same massage component, the wrappers on the two swing arms are connected by means of the same connecting member.

In some embodiments, the swing arms extend from the receiving spaces into the accommodating chamber, and the wrappers are inserted into side walls of the receiving spaces to detachably wrap outer sides of the swing arms.

In some embodiments, the connecting member is detachably arranged in the shell and located on at bottoms of the receiving spaces.

In some embodiments, in the same massage component, the wrappers and the connecting member are formed integrally.

In some embodiments, each of the wrappers comprises a wrapping portion and a deformation portion, the wrapping portion wraps an outer side of a corresponding swing arm, and the deformation portion is located at an end, away from the corresponding swing arm, of the wrapping portion.

In some embodiments, the deformation portion is in any one shape selected from a continuous wavy shape, a discontinuous protrusive shape, a circular shape, a curve shape, a polygonal shape and an irregular shape.

In some embodiments, projections of the wrapping portion and the deformation portion are located in an extension direction of a same arc line; the deformation portion is connected to the connecting member; and the connecting member comprises a connecting base and curve-shaped connecting arms, the connecting base is arranged at bottoms of the receiving spaces and is located at a side of curve-shaped connecting arms adjacent to the swing arms, and joints of the connecting arms and the wrapping portions are located on an opposite side of curve-shaped connecting arms, away from the swing arms.

In some embodiments, the deformation portion is in a curve shape with at least one bend to form a curved section; the deformation portion is connected to the connecting member; and the connecting member comprises a connecting base and curve-shaped connecting arms, the connecting base is arranged bottoms of the receiving spaces and are away from the swing arms, the curve-shaped connecting arms are connected between opposite ends of the connecting base and the deformation portions respectively, and the curved section of the deformation portion is located between a joint of the deformation portion and the connecting member and the wrapping portion.

In some embodiments, each of the receiving spaces comprises an opening defined at a side wall of the shell to communicate the receiving space with outside of the shell, the opening being in any one shape selected from a polygonal shape, a circular shape, an oval shape and an irregular shape.

In some embodiments, the receiving spaces are connected to two adjacent side walls of the shell.

In some embodiments, the driving device comprises a rotary motor and a driving component arranged on an output shaft of the rotary motor, and when the rotary motor rotates, the driving component is driven to swing back and forth in a plane perpendicular to an axis of the output shaft to thereby drive the massage component to swing back and forth.

In some embodiments, an axis of the rotary motor intersects with a length direction of the massage component.

In some embodiments, the massage component comprises a rotating portion located at ends of the swing arms and rotatably arranged in the accommodating chamber, a swing rod is arranged on the rotating portion, and an axis of the swing rod is perpendicular to a rotation axis of the rotating portion. The driving component comprises a swing disk, a bearing and a connecting disk; a first mounting hole and a second mounting hole are formed in the swing disk; the bearing is rotatably arranged in the first mounting hole; the connecting disk is fixedly arranged in the bearing, and an eccentric position of the connecting disk deviating from an axis of the bearing is fixedly connected to the output shaft; and an end of the swing rod is mounted in the second mounting hole and is able to rotate omnidirectionally in the second mounting hole.

In some embodiments, the rotating portion and the swing arms of the same massage component are formed integrally.

In some embodiments, a functional component is arranged on the shell and located on sides, away from the driving device, of the receiving spaces, and the functional component is used for driving the shell to vibrate or telescope The massage device provided by the embodiments of the application at least has the following beneficial effects:

the receiving spaces are arranged on at least two opposite side faces of the shell, and each of the receiving spaces is provided with a swing arm which is swingable relative to the shell of the massage device. The swing arms are wrapped with wrappers, such that the swing arms in the two receiving spaces can be driven by the driving device to swing in two directions to realize synchronous percussive massage of multiple body parts of the user without adjusting the direction in which the massage device is held.

BRIEF DESCRIPTION OF THE DRAWINGS

To more clearly explain the technical solutions in the embodiments of the application, drawings used for describing the embodiments of the application or the prior art will be briefly introduced below. Obviously, the drawings in the following description merely illustrate some embodiments of the application, and those ordinarily skilled in the art can obtain other drawings according to the following ones without creative labor.

DESCRIPTION OF THE EMBODIMENTS

Figure 1:
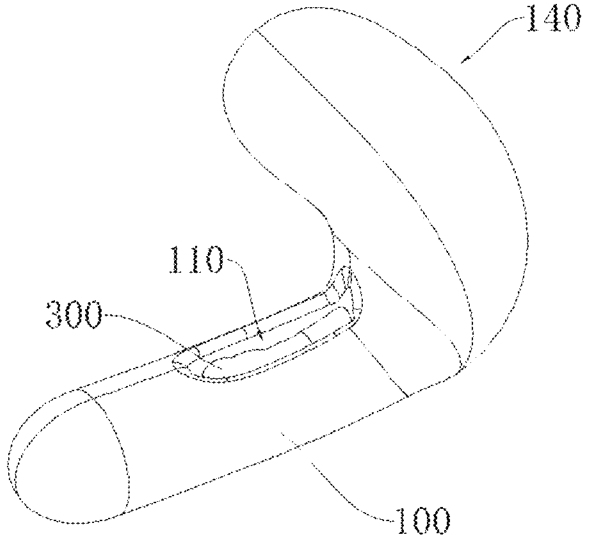
FIGS. 1 and 2 are perspective views of a massage device according to some embodiments of the application.
Figure 2:
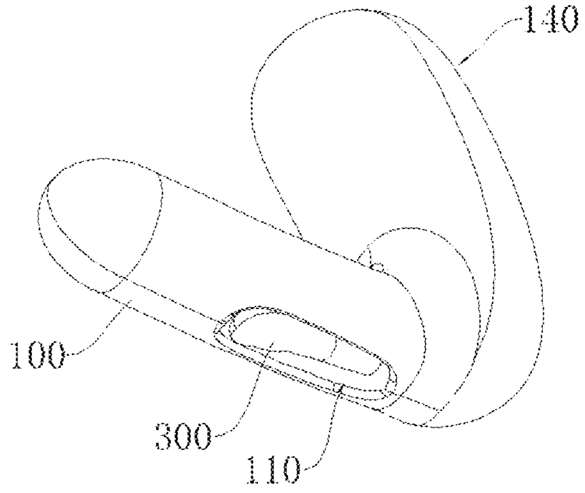

To better clarify the technical problems to be solved by the application and the technical solutions and beneficial effects of the application, the application is described in further detail below in conjunction with accompanying drawings and embodiments.

It should be understood that the specific embodiments described here are merely used for explaining the application and are not intended to limit the application.

It should be noted that when one element is referred to as being "fixed to" or "arranged on" the other element, it may be directly or indirectly located on the other element.

When one element is referred to as being "connected to" the other element, it may be directly or indirectly connected to the other element.

It should be understood that terms such as "length", "width", "upper", "lower", "front", "back", "left", "right", "vertical", "horizontal", "top", "bottom", "inner" and "outer" are used to indicate directional or positional relations based on the accompanying drawings merely for the purpose of facilitating and simplifying the description of the application, do not indicate or imply that devices or elements referred to must be in a specific direction or be configured and operated in a specific direction, and thus should not be construed as limitations of the application.

In addition, terms such as "first" and "second" are merely for a purpose of description and should not be construed as indicating or implying relative importance or implicitly indicating the number of technical features referred to. Therefore, a feature defined by "first" or "second" may explicitly or implicitly indicate the inclusion of one or more said features.

In the description of the application, "multiple" refer to two or more, unless otherwise expressly defined.

Referring to FIGS. 1-23, a massage device provided by the embodiments of the application is described below.

Referring to FIGS. 1-7, the massage device provided by the embodiments of the application comprises a shell 100, a driving device 200 and at least one massage component 300.

Specifically, receiving spaces 110 for receiving the massage components 300 are formed in at least two opposite side faces 102, 104 of the shell 100, that is, along the longitudinal section of the shell 100, every two receiving spaces 110 are arranged oppositely. The number of the receiving spaces 110 in the shell 100 may be two, four, or the like.

Further, each receiving space 110 has a certain depth and is connected to one side face 102/104 of the shell 100. It should be noted that the two opposite receiving spaces 110 may be mutually isolated from each other or partially communicated with each other, for example, as shown in FIGS. 12-17, wherein the two receiving spaces 110 are connected partially rather than completely as indicated by the dashed area in FIG. 17.

Moreover, an accommodating chamber 120 is formed in the shell 100, and a space for receiving the driving device 200 is formed in the accommodating chamber 120.

At least one massage component 300 is arranged, and the massage component 300 is connected to the driving device 200 and is driven by the driving device 200 to swing. Specifically, referring to FIGS. 7-10, the massage component 300 comprises two swing arms 310, and each swing arm 310 has a free end 310*a* and a driving end 310*b*; the free ends 310 of the two swing arms 310 are received in the two opposite receiving spaces 110 respectively, that is, every two opposite receiving spaces 110 correspondingly receive one massage component 300; and the driving ends 310*b* of the two swing arms 310 are both received in the accommodating chamber 120 to be connected to the driving device 200.

It should be understood that the two swing arms 310 of the same massage component 300 may be fixed together or be movable separately, and the application has no specific limitation in this aspect. In a case where the two swing arms 310 are fixed together, the two swing arms 310 swing synchronously in the same direction when driven by the driving device 200. In a case where the two swing arms 310 are movable separately, the two swing arms 310 swing in the same direction or in opposite directions when driven by the driving device 200.

Figure 3:
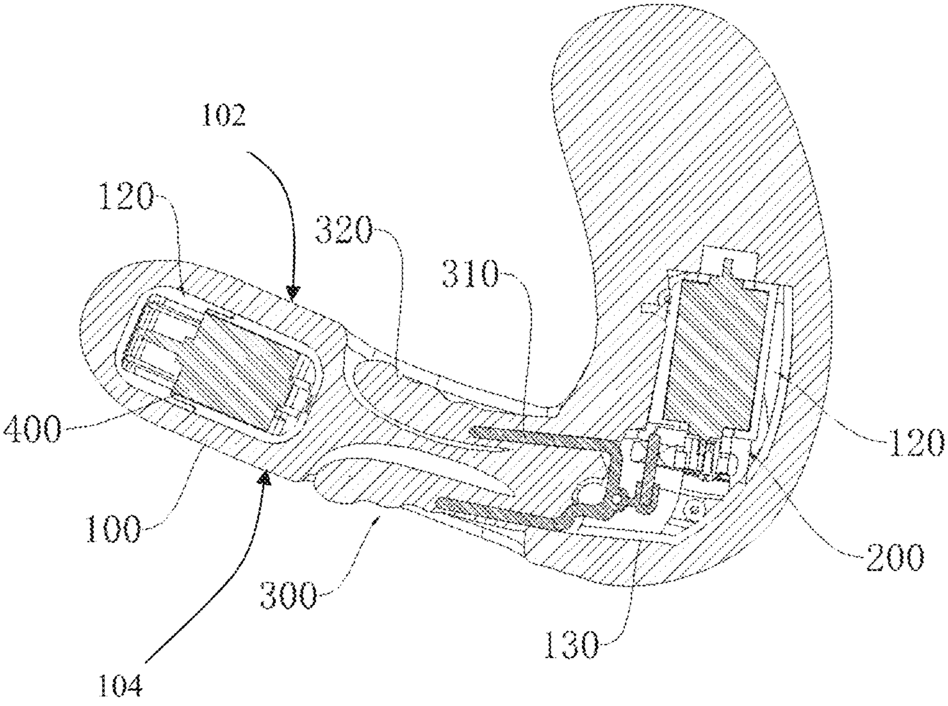
FIGS. 3-6 are sectional views of the massage device according to different embodiments of the application.
Figure 4:
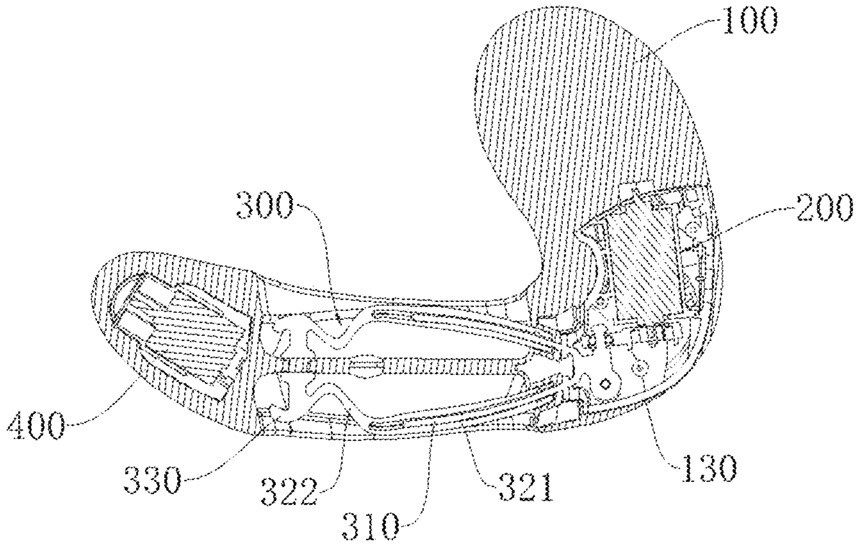
Figure 5:
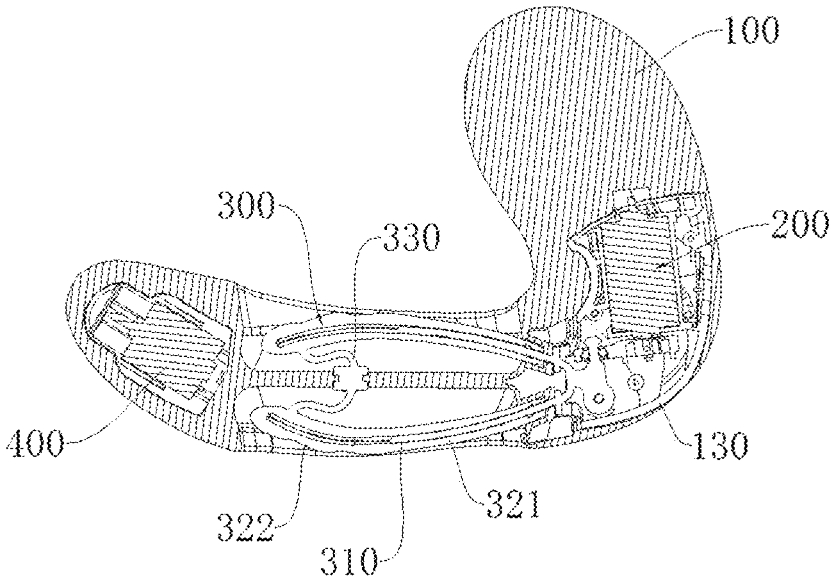

Referring to FIGS. 3-5, the free end 310*a* of each swing arm 310 is wrapped with a wrapper 320, which is made from silica gel or other elastic materials. By means of the wrappers 320, the massage component 300 can apply a gentle percussive force to a body part when used for percussive massage.

The ends, away from the free ends 310*a*, of the swing arms 310 are directly or indirectly connected to the driving device 200 so as to be driven by the driving device 200 to swing. When the swing arms 310 are driven by the driving device 200 to swing, the two swing arms 310 of the same massage component 300 swing back and forth in the same direction or in opposite directions inside the receiving spaces 110 and outside the shell 100.

In this way, when the massage device is used by a user to synchronously massage different body parts, the massage device can be placed between two body parts, and the two swing arms 310 of the massage component 300 swing back and forth to realize synchronous percussive massage for the two different body parts. Of course, when only one body part needs to be massaged, the user can select any one of the two swing arms 310 of the massage component 300 of the massage device to perform percussive massage on this body part, and the number of changes in the direction in which the massage device is held can be reduced, such that the massage device is easy to use.

Referring to FIGS. 3-5, in some embodiments, the thickness of the wrappers 320 is less than the depth of the receiving spaces 110 in the shell 100. In this way, when the swing arms 310 are driven by the driving device 200 to swing out of the receiving spaces 110 to percuss body parts to be massaged, the part, exceeding the thickness of the wrappers 320, of the receiving spaces 110 can provide a force accumulation distance for the swing arms 310 to realize percussion, and in a case where the user requires a large percussive force for massage, the swing arms 310 can sufficiently accelerate in advance in the receiving spaces 110 to avoid insufficient percussion.

In some embodiment, the shell 100 is made from an elastic material such as silica gel. The shell 100 made from the elastic material fulfils a better sense of touch when making contact with body parts, thus providing a comfort massage experience for customers. It should be understood that, in this embodiment, a support 130 is arranged in the accommodating chamber 120 of the shell 100, the driving device 200 is arranged on the support 130, and the swing arms 310 are swingably arranged on the support 130.

Further, referring to FIG. 3, in a case where the shell 100 is made from an elastic material, the wrappers 320 on the massage component 300 and the shell 100 are formed integrally from the same material. For example, the shell 100 and the wrappers 320 are integrally formed by injection molding. In this way, the wrappers 320 can be prevented from falling from the swing arms 310 when the massage component 300 swings quickly.

Figure 10:
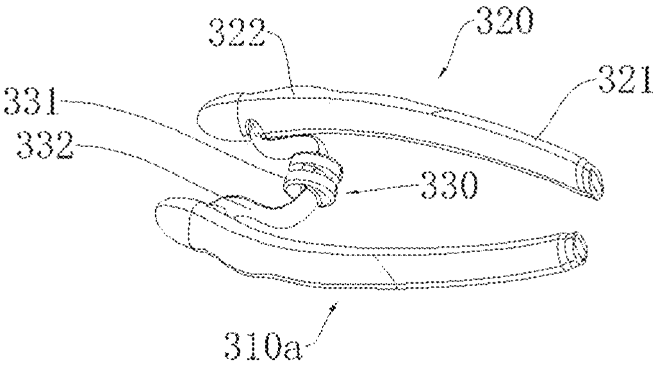
FIGS. 10 and 11 are perspective views of wrappers and a connecting member according to different embodiments of the application.
Figure 18:
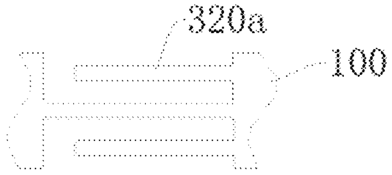
FIGS. 18-21 are schematic diagrams of different shapes of the wrapper according to different embodiments of the application.
Figure 19:
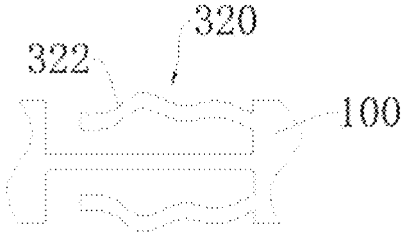
Figure 20:
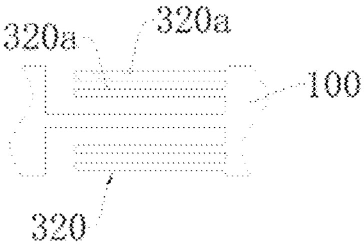
Figure 21:
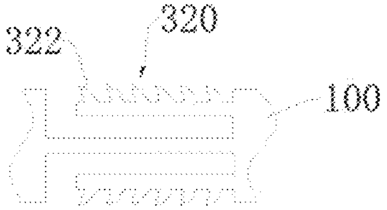
Figure 22:
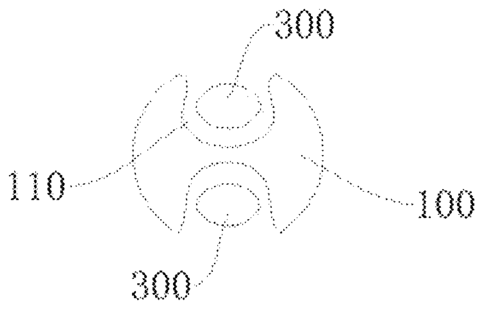
FIGS. 22 and 23 are schematic diagrams of different numbers of massage components and receiving spaces according to different embodiments of the application.
Figure 23:
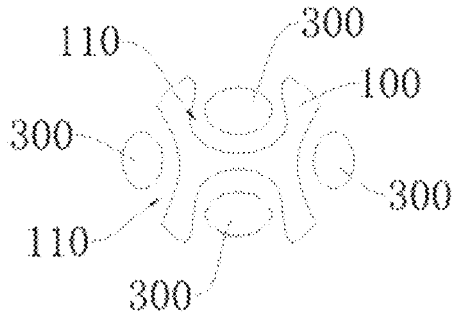

Referring to FIGS. 10, 18 and 20, in some embodiments, the wrapper 320 comprises at least one strip-shaped structure 320*a*. For example, in a case where the wrapper 320 comprises only one strip-shaped structure 320*a*, the strip-shaped structure 320*a* completely wraps an outer side of the swing arm 310. In a case where the wrapper 320 comprises multiple strip-shaped structures 320*a*, such as two or more, one of the multiple strip-shaped structures 320*a* completely wraps the outer side of the swing arm 310, and the other strip-shaped structures 320*a* are connected to the strip-shaped structure wrapping the outer side of the swing arm 310; or, ones ends of the multiple strip-shaped structures 320*a* wrap the outer side of the swing arm 310, and the other ends of the multiple strip-shaped structures 320*a* are kept in a flexible state to swing freely. By means of different configurations of the strip-shaped structures 320*a*, the user can obtain different percussive massage experiences.

Further, referring to FIGS. 4, 5, 10 and 11, a connecting member 330 is connected between the wrappers 321 and the shell 100. The connecting member 330 may be an elastic strip-shaped component, or a component with the rigidity greater than that of the wrappers 320. The application has no limitation in this aspect. It can be understood that the connecting member 330 may be fixedly arranged on the shell 100 or detachably arranged on the shell 100. Moreover, the connecting member 330 may be integrally formed on the wrappers 320 or detachably arranged on the wrappers 320. In addition, a joint of the connecting member 330 and the shell 100 may be located on side faces of the receiving spaces 110 or located at bottoms of the receiving spaces 110, and the application has no limitation in this aspect.

When the swing arms 310 are driven by the driving device 200 to swing back and forth, the wrappers 320 swing back and forth synchronously with the swing arms 310. The connecting member 330 is connected and arranged between the wrappers 320 and the shell 100, and the wrappers 320 and the swing arms 320 are both elastic, so when the swing arms 310 swing out of the receiving spaces 110, the wrappers 320 will be pulled by the connecting member 330 to deform elastically to a great extent to release the swing force, such that a gentle percussive force can be applied to body parts of the user by the massage component 300, thus improving the massage experience. In addition, because the connecting member 330 can release force to some extent, the driving device 200 can drive the massage component 300 to swing back and forth at a high frequency, thus providing a high-frequency and low-force massage experience for the users.

Referring to FIGS. 3-5, it can be understood that corresponding to the number of the receiving spaces 110, each swing arm 310 of each massage component 300 is wrapped with one wrapper 320, each swing arm 310 of the same massage component 300 is correspondingly arranged in one receiving space 110, and the wrappers 320 on the two swing arms 310 of the same massage component 300 are connected by means of the same connecting member 330.

Figure 6:
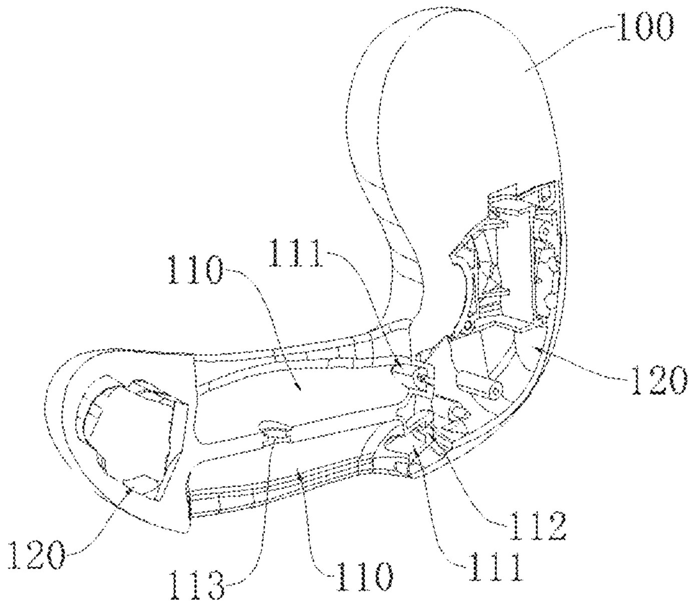

Referring to FIG. 6, in some embodiments, insertion holes 111 are formed in side walls of the receiving spaces 110, connecting slots 112 connected to the accommodating chamber 120 are formed in bottoms of the insertion holes 111. The swing arms 310 penetrate through the connecting slots 112, and the wrappers 320 are inserted into the insertion holes 111 and wrap the outer sides of the swing arms 310. In this way, when the massage device is assembled, the driving device 200 is assembled in the accommodating chamber 120 first, then the swing arms 310 penetrate through the connecting slots 112 to be connected to the driving device 200, and then the wrappers 320 wrap the outer sides of the swing arms 310, such that the massage component 200 is easily assembled.

Referring to FIGS. 4-6, based on the above embodiment, the connecting member 330 is arranged in the shell 100 and located at the bottoms of the receiving spaces 110. Specifically, a mounting hole 113 is defined in a partition plate located at the bottom of the two receiving spaces 110 and the mounting hole 113 extends through the partition plate located between the two receiving spaces 110. The connecting member 330 comprises a connecting base 331 (see FIGS. 10-11) and connecting arms 332 (see FIGS. 10-11) arranged on two sides of the connecting base 31. In assembly, the connecting base 331 is clamped in the mounting hole 113 to be detachably arranged in the shell 100. When the wrappers 320 swing along with the swing arms 310 to be away from the receiving spaces 110, the connecting member 330 allows the wrappers 320 to deform elastically to a great extent, such that a good force release effect of the wrappers 320 is realized.

Referring to FIGS. 4, 5, 10 and 11, based on the above embodiments, the wrappers 320 and the connecting member 330 in the same massage component 300 are formed integrally. For example, the wrappers 320 and the connecting member 330 are made from silica gel or rubber, thus having good elasticity; and the wrappers 320 and the connecting member 330 are formed integrally, thus being easy to assemble. Specifically, for example, in a case where the connecting member 330 is connected to and arranged at the bottoms of the receiving spaces 110, the mounting holes 113 are formed in the shell 110 and located in the bottom of the receiving spaces 110, and the connecting member 330 is clamped in the mounting hole 113 by means of elastic deformation to realize assembly and connection.

Figure 11:
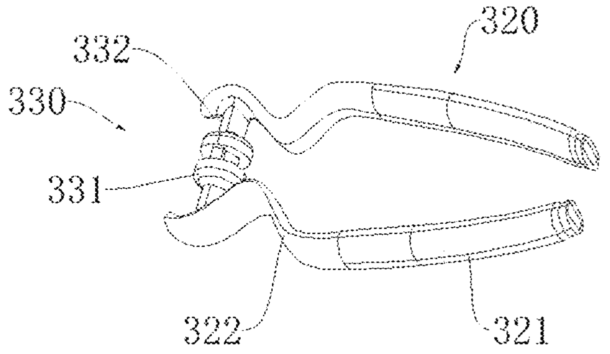
Figure 12:
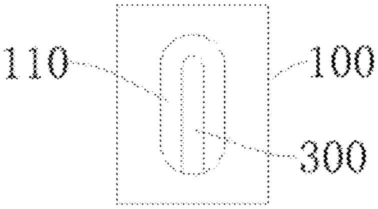
FIGS. 12-17 are schematic diagrams of different shapes of an opening of a receiving space according to different embodiments of the application.
Figure 13:
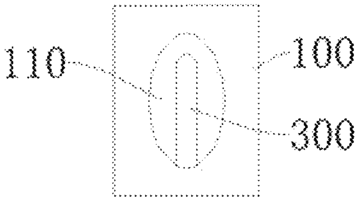
Figure 14:
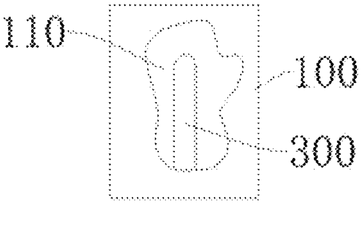
Figure 15:
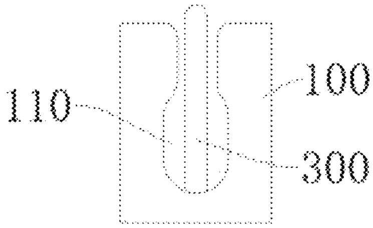
Figure 16:
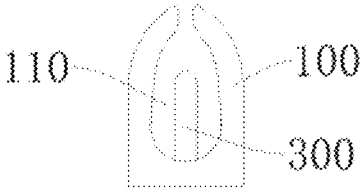
Figure 17:
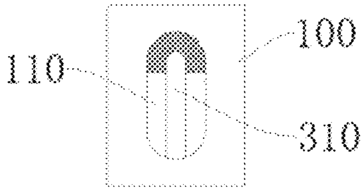

Referring to FIGS. 10 and 11, based on the above embodiments, the wrapper 320 comprises a wrapping portion 321 and a deformation portion 322. Specifically, the wrapping portion 321 wraps the outer side of the swing arm 310, and the deformation portion 322 is located on a side, away from the swing arm 310, of the wrapping portion 321. That is, the deformation portions 322 do not wrap the swing arms 310, such that the flexibility of the deformation portion 322 is better than the wrapping portion 321. Preferably, the deformation portion 322 has a V-shaped bending portion to improve its flexibility. When the massage component 300 swing back and forth, changes in the percussive force and swing direction of the deformation portions 322 are slower than those of the wrapping portions 321. In this way, the users can allow different portions of the wrappers 320 to make contact with their body parts to obtain different percussive massage experiences.

In a further embodiment, referring to FIGS. 10, 11, 19 and 20, the deformation portion 322 may be in any one shape selected from a wavy shape, a discontinuous protrusive shape, a circular shape, a curve shape, a polygonal shape and an irregular shape. By adopting different shapes of the deformation portion 322, the deformation portion 322 can provide different senses of percussive massage for the users, thus improving the massage experience.

Further, referring to FIGS. 10 and 11, in some embodiments, the deformation portion 322 of the wrapper 320 is connected to the connecting member 330. In this way, the deformation portions 322 can be pulled by the connecting member 330 to deform elastically to a great extent to alleviate the percussive force applied by the swing arms 310 to body parts of customers; moreover, the percussive force applied by the deformation portions 322 to the body parts is obviously different from the percussive force applied by the wrapping portions 321 to the body parts.

Referring to FIGS. 10 and 11, based on the above embodiments, the wrapper 330 and the connecting member 330 may have the following several implementations. In the following implementations, the connecting member 330 comprises a connecting base 331 and curved-shaped connecting arms 332, wherein the connecting base 331 is connected to and arranged at the bottoms of the receiving spaces 110, and the connecting arms 332 connect the deformation portions 322 to the connecting base 331.

Referring to FIG. 10, in some embodiments, projections of the wrapping portion 321 and the deformation portion 322 are located approximately in the extension direction of the same arc line. The connecting arm 332 is provided with at least one bend, the connecting base 331 is arranged at the bottoms of the receiving spaces 110 and are located at a side of the connecting arm 332 closer to the swing arms 310, and joints between the connecting arms 332 and the deformation portions 322 are located on sides, away from the swing arms 310, of the wrappers 320. By arranging the wrappers 320 and the connecting member 330 in this way, when the swing arms 310 drive the wrappers 320 to swing out of the receiving spaces 110, the wrapping portions 321 can bend to a large extent, and the connecting arms 332 can be pulled straight, thus fulfilling a good force release effect.

Referring to FIG. 11, in some embodiments, the deformation portion 322 is in a curve shape with at least one bend. The connecting base 331 is arranged the bottoms of the receiving spaces 110 and are away from the swing arms 310; and curved sections on the deformation portions 322 are located between joints of the deformation portions 322 and the connecting member 330 and the wrapping portions 321. In this way, when the swing arms 310 drive the wrappers 320 to swing out of the receiving spaces 110, the curved sections on the deformation portions 322 will be pulled straight to fulfil a force release effect.

Referring to FIGS. 12-17, based on the above embodiments, each of the receiving spaces 110 comprises an opening defined at side walls of the shell 100. The opening communicates the receiving space 110 with outside the shell 100. The opening of the receiving spaces 110 are in any one shape selected from a polygonal shape, a circular shape, an oval shape and an irregular shape.

It should be noted that the polygonal shape comprises, but not limited to, a triangular shape, a quadrilateral shape, a square shape and the like; and the irregular shape may be a heart shape or the like.

In some embodiments, the receiving space 110 is connected to two adjacent side walls of the shell 100. It should be noted that the two adjacent side walls refer to a side exactly facing the depth direction of the receiving spaces 110 and a side away from the driving device 200. In this way, the length of the massage component 300 is greater than that of the receiving spaces 110, that is, ends, away from the driving device 200, of the massage component 300 can stretch out of the receiving spaces. Because the massage component 300 is long enough, the massage component 300 can deform a large extent when driven by the driving device 200 to swing, thus providing different percussive massage experiences for customers.

Referring to FIGS. 3-8, based on the above embodiments, the driving device 200 comprises a rotary motor 210 and a driving component 220, and the driving component 220 is directly or indirectly connected to the massage component 300. Specifically, the driving component 220 is arranged on an output shaft 211 of the rotary motor 210. When the rotary motor 210 rotates, the driving component 220 swings back and forth in a plane perpendicular to the axis of the output shaft 211 to drive the massage component 300 to swing back and forth.

It can be understood that the axis of the output shaft 211 of the rotary motor 210 may be parallel to the length direction of the massage component 300 or may intersect with the length direction of the massage component 300, for example, the axis of the output shaft 211 of the rotary motor 210 is perpendicular to the length direction of the massage component 300.

Referring to FIGS. 3-5, 7 and 8, in the following embodiments, the axis of the output shaft 211 of the rotary motor 210 is perpendicular to the length direction of the massage component 300 by way of example.

Figure 7:
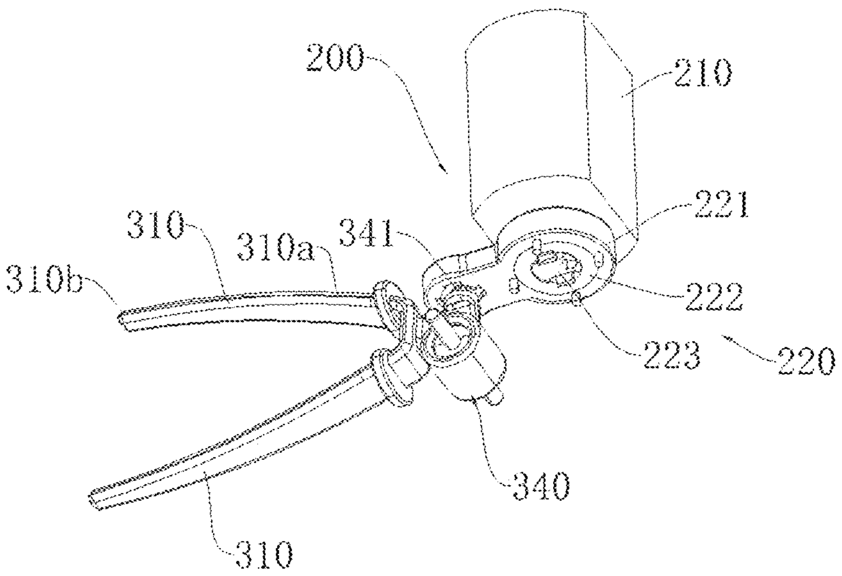
FIG. 7 is an assembly view of a driving device and swing arms according to some embodiments of the application.
Figure 8:
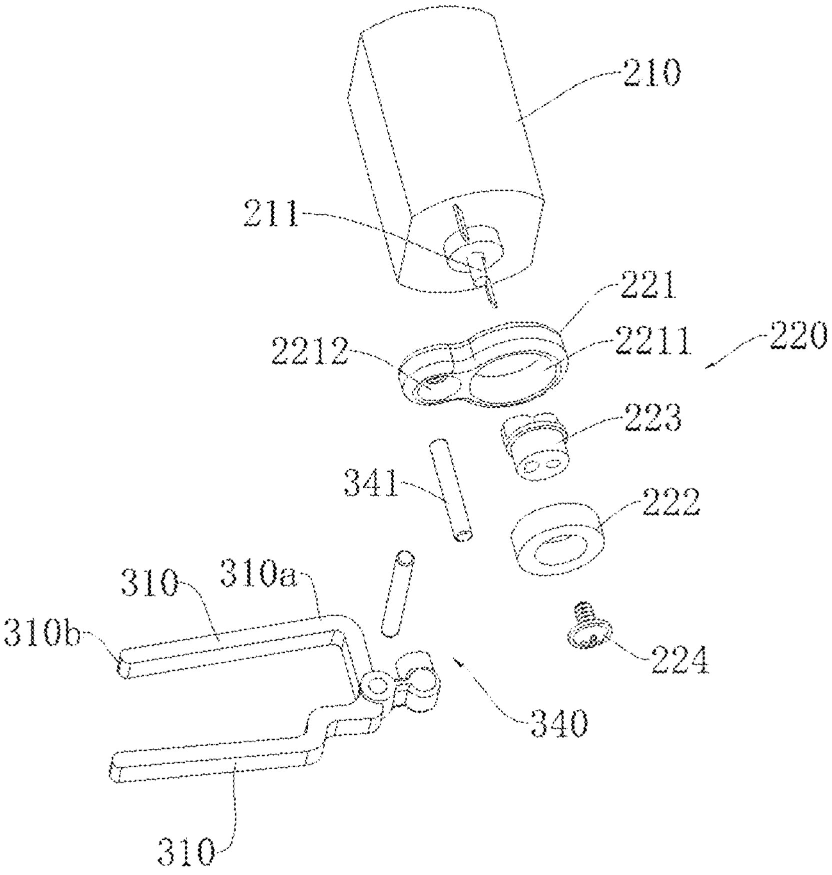
FIG. 8 is an exploded view of the driving device and the swing arms according to some embodiments of the application.

Referring to FIGS. 7 and 8, the driving component 220 comprises a swing disk 221, a bearing 222 and a connecting disk 223; the massage component 300 comprises a rotating portion 340, and a swing rod 341 is arranged on the rotating portion 340 and connected to the swing disk 221. It should be understood that the rotating portion 340 corresponds to the driving ends 310*b* of the swing arms 310.

Referring to FIG. 8, specifically, a first connecting slot 2211 and a second connecting slot 2212 are formed in the swing disk 221, the bearing 222 is rotatably arranged in the first mounting hole 2211, that is, an outer ring of the bearing 222 abuts against a wall of the first mounting hole 2211 to be fixed, the connecting disk 223 is arranged in an inner ring of the bearing 222, specifically, the connecting disk 223 is clamped in the inner ring of the bearing 222 by a buckle or is in butt connection with the inner ring of the bearing 222 by means of a bolt 224. Further, an eccentric position of the connecting disk 223 deviating from the axis of the bearing 222 is fixedly connected to the output shaft 211 of the rotary motor 210.

Referring to FIGS. 7 and 8, the rotating portion 240 of the massage component 300 is rotatably arranged in the accommodating chamber 120 and the axis of the swing rod 341 intersects with and is perpendicular to the rotation axis of the rotating portion 340, that is, the swing axis of the massage component 300 is perpendicular to the axis of the swing rod 341. The two swing arms 310 and the rotating portion 340 are formed integrally, and the swing arms 310 penetrate through the accommodating chamber 120 and the receiving spaces 110. One end of the swing rod 341 is inserted into the second mounting hole 2212 and is able to rotate with respect to the second mounting hole 2212.

By adopting such a structure of the driving component 220, when the rotary motor 210 rotates, the swing disk 221 can swing back and forth in a plane perpendicular to the axis of the output shaft 211 to drive the swing rod 341 to swing around the swing axis of the massage component 300, and then the swing rod 341 drives the swing arms 310 to swing to realize a massage effect.

Figure 9:
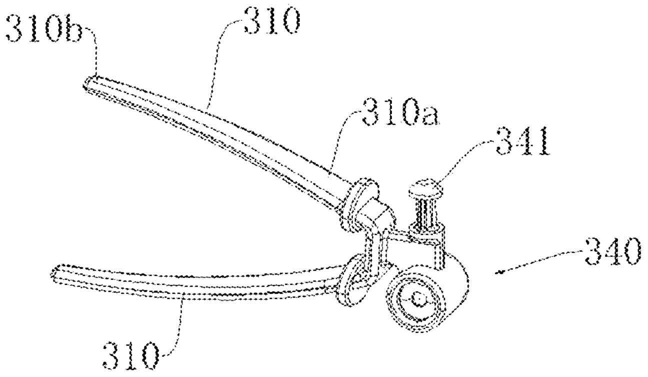
FIG. 9 is a perspective view of the swing arms according to some embodiments of the application.

Referring to FIG. 9, based on the above embodiments, in some embodiments, the two swing arms 310 of the same massage component 300 are formed integrally, that is, the two swing arms 310 synchronously swing in the same direction.

Referring to FIGS. 3-5, in some embodiments, a functional component 400 is arranged on the shell 100 and located on sides, away from a driving motor, of the receiving spaces 110, and the functional component 400 is used for driving the shell 100 to vibrate or expand and contract. By means of the functional component 400, the massage device not only has a better percussive massage effect, but also can provide various massage effects such as vibratory massage and percussive massage.

It should be understood that in this embodiment, the receiving spaces 110 are only connected to side walls, opposite to the length direction of the receiving spaces 110, of the shell 100. Moreover, in this embodiment, two accommodating chambers 120 are formed in the shell 100 and are located on opposite sides of the receiving spaces 110 respectively, one accommodating chamber 120 is used for receiving the driving device 200, and the other accommodating chamber 120 is used for receiving the functional component 400.

It should be understood that when the functional component 400 is used for driving the shell 100 to vibrate, the functional component 400 may be a vibration motor; and when the functional component 400 is used for driving the shell 100 to expand and/or contract, the functional component 400 may be a linear movement mechanism such as a linear motor. In addition, it should be understood that the shell 100 needs to be made from an elastic material, and the shell located around the functional component 400 is relatively thin to satisfy the expand and contract requirement.

The above embodiments are merely preferred ones of the invention and are not used for limiting the application. Any amendments, equivalent substitutions and improvements made based on the spirit and principle of the application should also fall within the protection scope of the application.

What is claimed is:

1. A massage device, comprising:

a shell, wherein receiving spaces which are mutually isolated or partially connected are formed in at least two opposite side faces of the shell, and each of the receiving spaces has a depth and is connected to a corresponding one of the side faces of the shell; an accommodating chamber is formed in the shell; the accommodating chamber is located on a side of the receiving spaces;

a driving device arranged in the accommodating chamber; and at least one massage component connected to the driving device and driven by the driving device to swing, wherein each of the at least one massage component comprises two swing arms and wrappers wrapping free ends of the swing arms, and the free ends of the swing arms are respectively located in the receiving spaces oppositely arranged on the shell; and when the driving device drives the at least one massage component to swing, the two swing arms on a same massage component swing in a same direction or in opposite directions between inside the receiving spaces and outside the shell.

2. The massage device according to claim 1, wherein each of the wrappers has a thickness less than the depth of a corresponding one of the receiving spaces in the shell.

3. The massage device according to claim 1, wherein the shell is made from an elastic material.

4. The massage device according to claim 3, wherein the wrappers and the shell are formed integrally from the same elastic material.

5. The massage device according to claim 1, wherein each of the wrappers comprises at least one strip-shaped structure.

6. The massage device according to claim 1, wherein the wrappers are connected to the shell by means of a connecting member, and in the same massage component, the wrappers on the two swing arms are connected by means of the same connecting member.

7. The massage device according to claim 6, wherein the swing arms extend from the receiving spaces into the accommodating chamber, and the wrappers are inserted into side walls of the receiving spaces to detachably wrap outer sides of the swing arms.

8. The massage device according to claim 6, wherein the connecting member is detachably arranged in the shell and located on at bottoms of the receiving spaces.

9. The massage device according to claim 6, wherein in the same massage component, the wrappers and the connecting member are formed integrally.

10. The massage device according to claim 6, wherein each of the wrappers comprises a wrapping portion and a deformation portion, the wrapping portion wraps an outer side of a corresponding swing arm, and the deformation portion is located at an end, away from the corresponding swing arm, of the wrapping portion.

11. The massage device according to claim 10, wherein the deformation portion is in any one shape selected from a continuous wavy shape, a discontinuous protrusive shape, a circular shape, a curve shape, a polygonal shape and an irregular shape.

12. The massage device according to claim 10, wherein projections of the wrapping portion and the deformation portion are located in an extension direction of a same arc line; the deformation portion is connected to the connecting member; and the connecting member comprises a connecting base and curve-shaped connecting arms, the connecting base is arranged at bottoms of the receiving spaces and is located at a side of curve-shaped connecting arms adjacent to the swing arms, and joints of the connecting arms and the wrapping portions are located on an opposite side of curve-shaped connecting arms, away from the swing arms.

13. The massage device according to claim 10, wherein the deformation portion is in a curve shape with at least one bend to form a curved section; the deformation portion is connected to the connecting member; and the connecting member comprises a connecting base and curve-shaped connecting arms, the connecting base is arranged bottoms of the receiving spaces and are away from the swing arms, the curve-shaped connecting arms are connected between opposite ends of the connecting base and the deformation portions respectively, and the curved section of the deformation portion is located between a joint of the deformation portion and the connecting member and the wrapping portion.

14. The massage device according to claim 1, wherein each of the receiving spaces comprises an opening defined at a side wall of the shell to communicate the receiving space with outside of the shell, the opening being in any one shape selected from a polygonal shape, a circular shape, an oval shape and an irregular shape.

15. The massage device according to claim 1, wherein each of the receiving spaces is connected to two adjacent side walls of the shell.

16. The massage device according to claim 1, wherein the driving device comprises a rotary motor and a driving component arranged on an output shaft of the rotary motor, and when the rotary motor rotates, the driving component is driven to swing back and forth in a plane perpendicular to an axis of the output shaft to thereby drive the massage component to swing back and forth.

17. The massage device according to claim 16, wherein an axis of the rotary motor intersects with a length direction of the massage component.

18. The massage device according to claim 17, wherein:

the massage component comprises a rotating portion located at ends of the swing arms and rotatably arranged in the accommodating chamber, a swing rod is arranged on the rotating portion, and an axis of the swing rod is perpendicular to a rotation axis of the rotating portion;

the driving component comprises a swing disk, a bearing and a connecting disk; a first mounting hole and a second mounting hole are formed in the swing disk; the bearing is rotatably arranged in the first mounting hole; the connecting disk is fixedly arranged in the bearing, and an eccentric position of the connecting disk deviating from an axis of the bearing is fixedly connected to the output shaft; and an end of the swing rod is mounted in the second mounting hole and is able to rotate omnidirectionally in the second mounting hole.

19. The massage device according to claim 18, wherein the rotating portion and the swing arms of the same massage component are formed integrally.

20. The massage device according to claim 1, wherein a functional component is arranged on the shell and located on sides, away from the driving device, of the receiving spaces, and the functional component is used for driving the shell to vibrate or telescope.

* * * * *